United States Patent [19]

Horace

[11] Patent Number: 5,068,949

[45] Date of Patent: Dec. 3, 1991

[54] ROPE CONNECTOR HAVING QUICK ENGAGING AND RELEASING MEANS

[76] Inventor: Martin J. Horace, 2095 Sunset Point Rd., Clearwater, Fla. 34625

[21] Appl. No.: 628,283

[22] Filed: Dec. 14, 1990

[51] Int. Cl.⁵ .............................................. A44B 21/00
[52] U.S. Cl. ................................. 24/115 R; 24/132 R
[58] Field of Search ............ 24/115 R, 115 F, 115 A, 24/115 H, 132 R, 132 WL, 616, 618, 499, 500; 403/344

[56] References Cited

U.S. PATENT DOCUMENTS

| | | | |
|---|---|---|---|
| 633,632 | 9/1899 | Wilson | 24/132 R |
| 761,926 | 6/1904 | Van Loghem | 24/132 R |
| 1,365,762 | 1/1921 | Zinow | 24/115 H |
| 1,564,995 | 12/1925 | Allen | 24/132 R |
| 2,686,520 | 8/1954 | Jarvis et al. | 24/132 WL |
| 3,896,527 | 7/1975 | Miller et al. | 24/132 R |
| 4,493,134 | 1/1985 | Karr | 24/132 R |
| 4,532,682 | 8/1985 | Murad | 24/616 |
| 4,594,752 | 6/1986 | Garner, Sr. | 24/132 R |

Primary Examiner—Victor N. Sakran
Attorney, Agent, or Firm—Joseph C. Mason, Jr.; Ronald E. Smith

[57] ABSTRACT

A rope clamp that quickly joins together ropes and eliminates the need for knots. The clamp has two elongate main parts that are hingedly connected together. Each part has rows of transversely aligned teeth that engage diametrically opposite sides of a pair of ropes held by the clamp when the clamp is brought into sandwiching relation to the ropes. The clamp is held closed by a latch and catch construction having more than one position of engagement, and a push button provides quick release of the latch and catch when it is intended to free the ropes. An insert member, also having transversely disposed teeth, is added to the clamp when ropes of smaller diameter are yoked together.

4 Claims, 3 Drawing Sheets

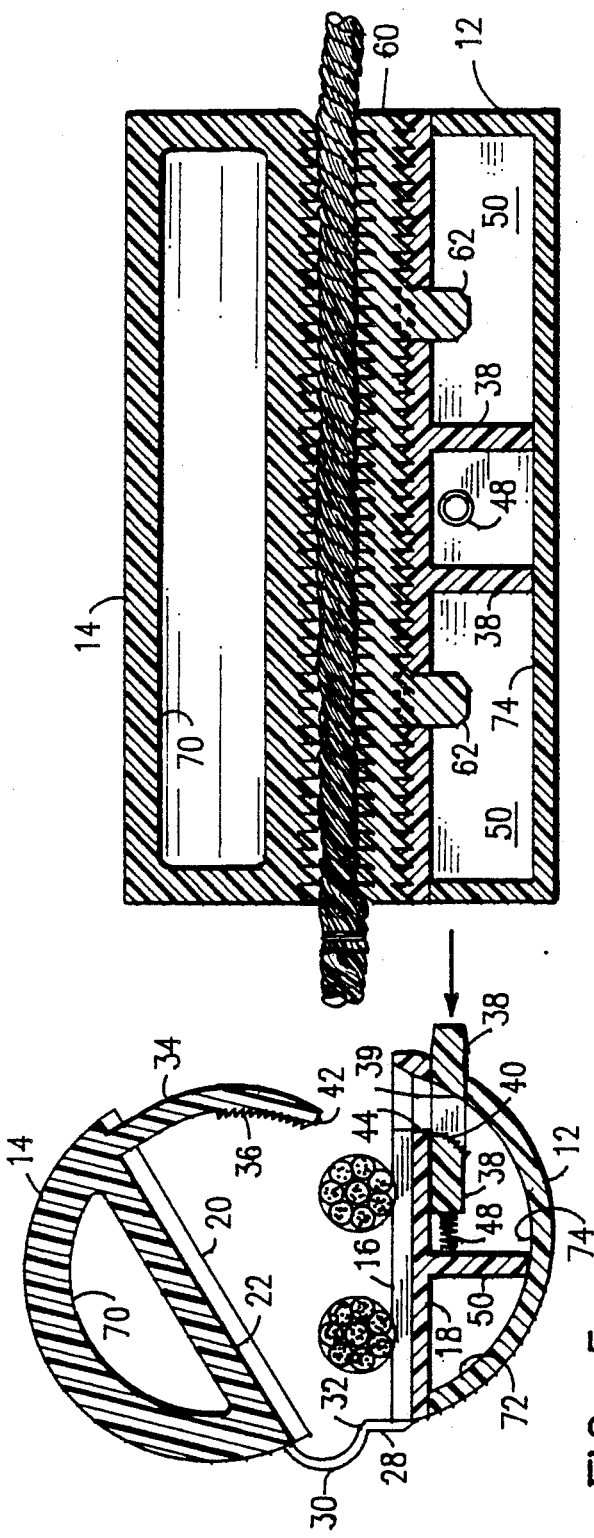

ROPE CONNECTOR HAVING QUICK ENGAGING AND RELEASING MEANS

TECHNICAL FIELD

This invention relates, generally, to devices that obviate the need to use knots when connecting ropes together. More particularly, it relates to such a device adapted to facilitate very quick connection of ropes and an equally quick disconnection thereof.

BACKGROUND ART

It has long been observed that tying together two ropes with knots is both time consuming and unreliable. Unless expertly tied, many common rope-connecting knots will become loose and slip with the passage of time.

Accordingly, inventors have developed numerous devices having utility in connecting together rope ends in the absence of knots.

For example, U.S. Pat. No. 4,594,742 to Garner shows a rope connector having a pair of mating jaws that are selectively latched to hold a pair of ropes that run in parallel bores along the entire extent of a rope clamp. An insert accommodates different rope diameters. U.S. Pat. Nos. 1,529,257 to Lampl and 1,708,470 are also of interest, as is German patent no. 255,827. U.S. Pat. No. 3,896,527 to Miller et al. adds a latch mechanism having serrations or teeth for adjustably closing the jaws of the Miller et al. device. U.S. Pat. Nos. 2,970,353 to Stone and 3,320,958 to Nolan are also of interest for their disclosure of mating sets of serrations, projections or teeth for adjustable locking of the latching means.

These and other devices have utility in connecting ropes in the absence of knots. However, the user of these devices must pay some attention to the rope-connecting process. Since the major purpose of a rope-connecting device is to save time, any time spent on aligning the rope and its connector detracts from the value of the device. What is needed is a rope-connecting device that enables its user to connect ropes together in an instant, and to just as quickly release the connector when desired. The prior art, considered as a whole in accordance with the requirements of law, neither teaches nor suggests how such a device could be built.

DISCLOSURE OF INVENTION

The longstanding but heretofore unfulfilled need for a rope connector that facilitates speedy engagement of a pair of ropes is now fulfilled by a device that includes, in a first embodiment, a base member and a closure member that are hingedly connected to one another and which have teeth formed therein so that when the closure member is brought into overlying relation to said base member, a rope positioned therebetween will be tightly held against axial movement by said teeth. In a second embodiment, a toothed insert member overlies the base member and enables engagement of a rope of smaller diameter.

In both embodiments, a latch and catch member engage one another in successively tighter engagements so that the user of the clamp may select the degree of clamping desired. Thus, in a first interlocked position, a first resistance to rope withdrawal is provided and in the second and third positions, successively increased resistances to rope withdrawal are provided. The increased resistances are provided by imparting greater compressive forces to said base means and closure means, i.e., the user of the device simply squeezes the device tighter in order to obtain stronger grips on the ropes.

To facilitate quick release of the ropes, a biased push button is provided to facilitate quick unlocking of the interconnected latch and catch members. More particularly, the catch member is formed into the push button adjacent an opening formed in the button that receives the latch member. Pressing the button drives the catch away from the latch and the resiliency of the ropes springs the novel clamp open.

Thus it is understood that a primary object of this invention is to provide a rope connector means that does not require the operator to make any special alignments between the device and the ropes to be connected in order to obtain a good connection.

Another very important object of the invention is to provide a quick release means that releases the ropes instantly on demand.

These and many other important objects, advantages and features of the invention will become more apparent as this description proceeds.

The invention accordingly comprises the features of construction, combination of elements and arrangement of parts that will be exemplified in the construction set forth hereinafter and the scope of the invention will be set forth in the claims.

DESCRIPTION OF THE DRAWINGS

For a fuller understanding of the nature and objects of the invention, reference should be made to the following detailed description, taken in connection with the accompanying drawings, in which:

FIG. 5 is a transverse sectional view of the connector when it is open;

FIG. 6 longitudinal sectional view taken along the line 6—6 in FIG. 4; and

FIG. 7 is a perspective view of the quick release means of this invention.

BEST MODES FOR CARRYING OUT THE INVENTION

Figure 1:
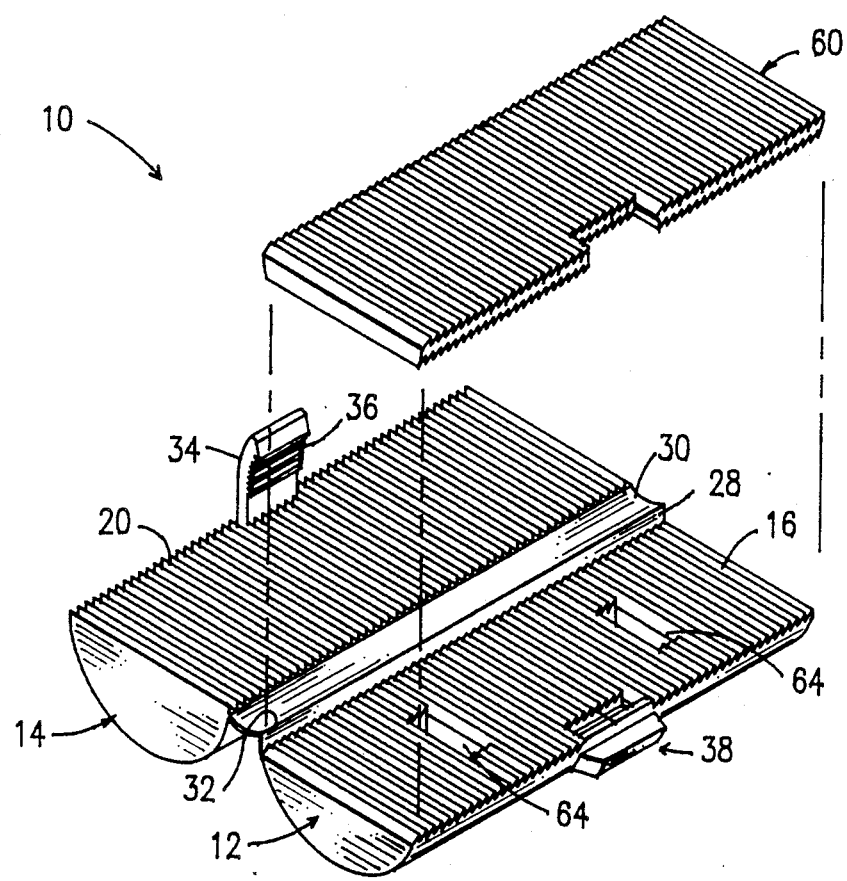
FIG. 1 is a perspective, exploded view of an illustrative embodiment of the novel rope connector showing the connector in its open configuration.
Figure 2:
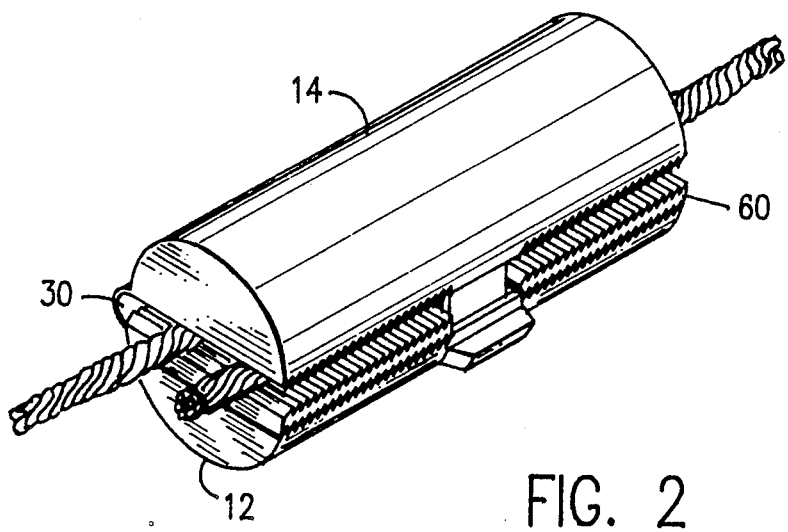
FIG. 2 a perspective view of the novel connector in its closed or operative configuration.

Referring now to FIG. 1, it will there be seen that an illustrative embodiment of the invention is denoted as a whole by the reference numeral 10.

Rope clamp 10 includes base member 12 and closure member 14, each of which is preferably of semicircular configuration when seen in end view or transverse section. Members 12 and 14 share a common longitudinal extent.

Plural rows of parallel, transversely aligned and equidistantly spaced teeth members, collectively denoted 16, are formed in the rope-gripping surface 18 (see FIGS. 3–5) of base member 12 and similar rows of teeth 20 are formed in the confronting rope-gripping surface 22 of closure member 14.

Each tooth member of teeth 16 and 20 terminates in a sharp, rope-engaging point. The included angle of each tooth is about sixty degrees, although empirical tests may show that a different angle performs the rope-engaging function of teeth 16 and 20 even better.

An elongate, substantially rigid vertical wall 28 extends along a preselected edge of base member 12 and projects upwardly therefrom as depicted. A flexible hinge means 30 has a first edge integrally formed with upper edge 32 of said wall 28 and a second edge formed integral with a preselected edge of closure member 14 as shown.

Thus, it should be clear that closure member 14 is brought into overlying relation to base member 12 by rotating said former member about said hinge. It should also be clear that ropes resting atop the base member 12 will then be sandwiched between the base and closure members and diametrically opposite sides of said ropes will be engaged by teeth 16 and 20 as depicted in FIGS. 2-6. If externally imparted pressure is applied to members 12 and 14 to drive them toward one another, the teeth will engage the ropes with a force directly proportional to the strength of the converging forces and the ropes will be held against axial or longitudinally-directed displacement by said teeth.

The external converging forces are imparted by the user of the device; specifically, the clamp 10 is grasped in the user's hand or hands and the strength of the grip determines how hard the teeth 16 and 20 will bite into the ropes and hold them.

A latch means is provided to relieve the user of the need to maintain a prolonged grip on the clamp 10. The latch means is constructed so that the user may lay the ropes to be joined on top of the base member 12 and slap the closure member 14 closed and squeeze the unit 10 and lock it into its squeezed, rope-gripping configuration, in a swift series of motions in the absence of any need to align the ropes or pay attention to the latching mechanism that holds the unit closed.

Figure 3:
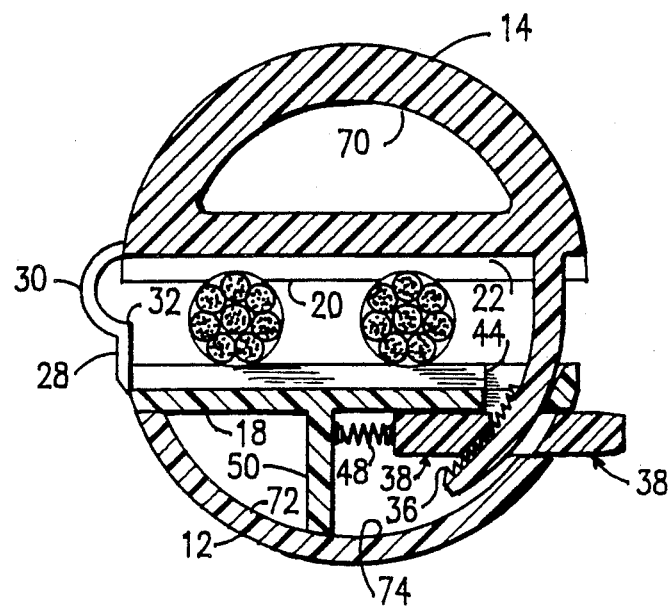
FIG. 3 is a transverse sectional view of the connector when in its closed configuration, and when the insert member is not used.
Figure 4:
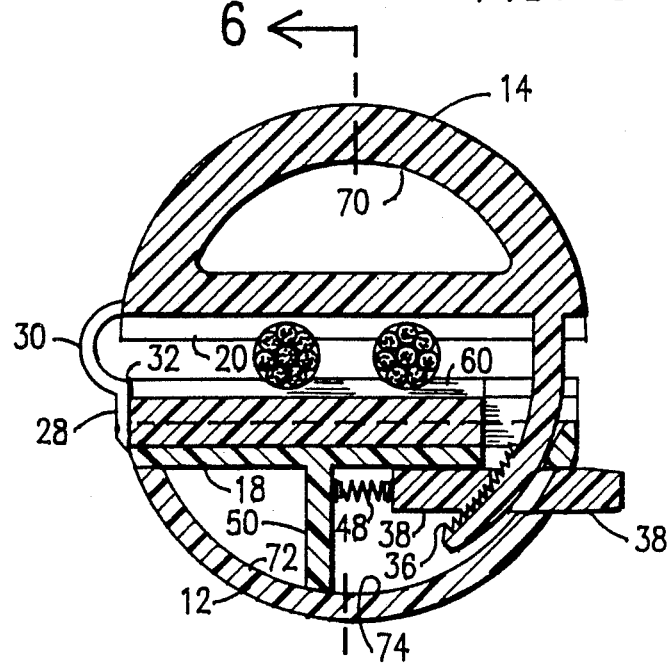
FIG. 4 is a transverse sectional view of the connector when closed and when the insert member is used.

The novel latch means includes a latch member 34 of slightly arcuate configuration as best shown in FIGS. 3-5. As depicted, latch 34 is formed integral to the outer edge of closure member 14; a plurality of teeth, collectively denoted 36, are formed on an inner side thereof as shown.

The latch means further includes a biased catch member 38 in the form of a push button means (see FIG. 7) that is positioned in base member 12 in cooperative relation to latch 34 as shown in FIGS. 3-5. Catch member 38 is slidably mounted to the underside of wall 18 and includes teeth, collectively denoted 40, (FIG. 5) which are adapted to engage teeth 36 formed on latch 34, as perhaps best understood in connection with FIGS. 3 and 4. A relatively light closure of clamp 10 results in engagement of latch teeth 36 and catch teeth 40. Even this light closure will compress the ropes somewhat and maintain them against inadvertent retraction from clamp 10. A greater exertion of force compressses the ropes even more and a very strong exertion makes axial displacement of the ropes virtually impossible. FIGS. 3 and 4 depict the clamp when a moderate, i.e., neither light nor strong, converging force is applied.

The free end of latch 34 is tapered as at 42 (FIG. 5); this facilitates alignment of latch 34 and opening 39 formed in catch 38 to the extent that the user of clamp 10 need not conduct any alignment maneuvers whatsoever because any misalignment is compensated for by said taper 42.

Base 12 includes opening 44 that receives latch 34; opening 44 aligns with opening 39 formed in push button 38.

Push button 38 provides a quick release of clamp 10 even when it is closed in its tightest configuration. The bias is supplied, preferably, by a coil compression spring 48 having a first end that bears against wall 50 and a second end that bears against the push button.

A second embodiment of the invention is also shown in the Figures. It includes an insert member 60 adapted to overlie the toothed surface of base member 12 as should be clear from FIG. 1. Both sides of insert 60 are toothed, as shown in FIG. 6, to avoid deformation of teeth 16. A pair of protuberances, collectively denoted 62 in FIG. 6, are formed in the bottom side of insert 60 and are slidably received within complementally formed recesses 64 (FIG. 1) formed in the toothed surface 18 of base 12. The protuberances and recesses provide a positioning and alignment means for insert 60 so that insert 60 is in registration with the toothed surface 18 of base 12 when said protuberances and recesses are cooperatively engaged to one another. Together with the teeth formed on the bottom of the insert, which interlock with teeth 16, these members retain insert 60 against longitudinal travel when ropes supported thereby are pulled in an axial direction.

It should be noted that the thickness of insert 60 is substantially equal to the height of vertical wall 28. Thus, it should be understood that insert 60 is used when clamping ropes of smaller diameter relative to the ropes clamped with the first embodiment. As an example of the utility of insert 60, suppose vertical wall 28 is one quarter inch in height. A rope having a diameter of about one half inch can be clamped when no insert 60 is installed by latching together the base and closure members 12 and 14 in the above-described manner, as depicted in FIG. 3. A rope of one quarter inch diameter, however, would not be well-clamped in the absence of insert 60, however, due to the height of vertical wall 28. The use of insert 60, then, effectively eliminates the height of vertical wall 28 so that ropes of one quarter inch diameter can be just as effectively clamped as ropes of larger diameter, as should be understood in connection with FIG. 4.

The cylindrical outer surfaces of clamp 10 are not critical to the invention and are provided primarily to make it easy to grasp and squeeze said clamp. Finger grips, not shown, could be provided. Moreover, since clamp 10 may be used at sea, it is hollowed out at least to some extent as at 70 (closure member 14) and 72, 74 (base member 12) as shown in FIGS. 3-6 to provide buoyancy in the event it falls overboard. Such voids also save materials, of course.

This invention is clearly new and useful. Moreover, it was not obvious to those of ordinary skill in the art at the time it was made, in view of the prior art when considered as a whole.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention which, as a matter of language, might be said to fall therebetween.

Now that the invention has been described,

What is claimed is:

1. A clamp that holds ropes together, comprising:

a base member;

a closure member;

a hinge means hingedly interconnecting said base member and said closure member;

a latch means for holding said closure member in overlying relation to said base member;

a plurality of teeth members formed in said base member;

a plurality of teeth members formed in said closure member;

said respective teeth members formed in said base and closure members being disposed in confronting relation to one another when said closure member is disposed in overlying relation to said base member so that a rope sandwiched between said base and closure members is gripped along its extent by said respective teeth members and held against axial displacement thereby;

quick release means for disengaging said latch means;

said base and closure members being of elongate construction and having a substantially equal longitudinal extent;

said respective teeth members being formed transverse to the respective longitudinal extents of said base and closure members;

a toothed insert member of predetermined thickness disposed in overlying relation to said base member;

a vertical wall extending along a preselected longitudinal edge of said base member having sufficient height to cooperate with an associated wedge to grip a thin rope between said base and said closure member; and said hinge means having a first longitudinally extending edge integral to a top edge of said vertical wall and a second longitudinally extending edge integral to a preselected longitudinally disposed external edge of said closure member.

2. The clamp of claim 1, wherein said latch means includes a latch member and a catch member and wherein said latch and catch members are adapted to engage one another at progressively closer spaced intervals.

3. The clamp of claim 2, wherein said quick release means includes a biased push button member that, when pressed, separates and disengages said latch member from said catch member.

4. The clamp of claim 1, wherein said vertical wall has a height substantially equal to the predetermined thickness of said insert member.

* * * * *

UNITED STATES PATENT AND TRADEMARK OFFICE
CERTIFICATE OF CORRECTION

PATENT NO. : 5,068,949
DATED : December 3, 1991
INVENTOR(S) : Horace J. Martin

It is certified that error appears in the above-identified patent and that said Letters Patent is hereby corrected as shown below:

On the title page item [76] Inventor: should read --Horace J. Martin--; and item [19] should read --Martin--.

Signed and Sealed this

Twenty-first Day of April, 1992

Attest:

HARRY F. MANBECK, JR.

*Attesting Officer*  *Commissioner of Patents and Trademarks*